Oct. 25, 1960 J. A. MASON 2,957,508
TOBACCO CUTTING MACHINES
Filed May 19, 1959 4 Sheets-Sheet 1

INVENTOR
James Arthur Mason
BY
Watson, Cole, Grindle & Watson
ATTORNEYS

Oct. 25, 1960 J. A. MASON 2,957,508
TOBACCO CUTTING MACHINES
Filed May 19, 1959 4 Sheets-Sheet 2

INVENTOR
James Arthur Mason
BY
Watson, Cole, Grindle & Watson
ATTORNEY

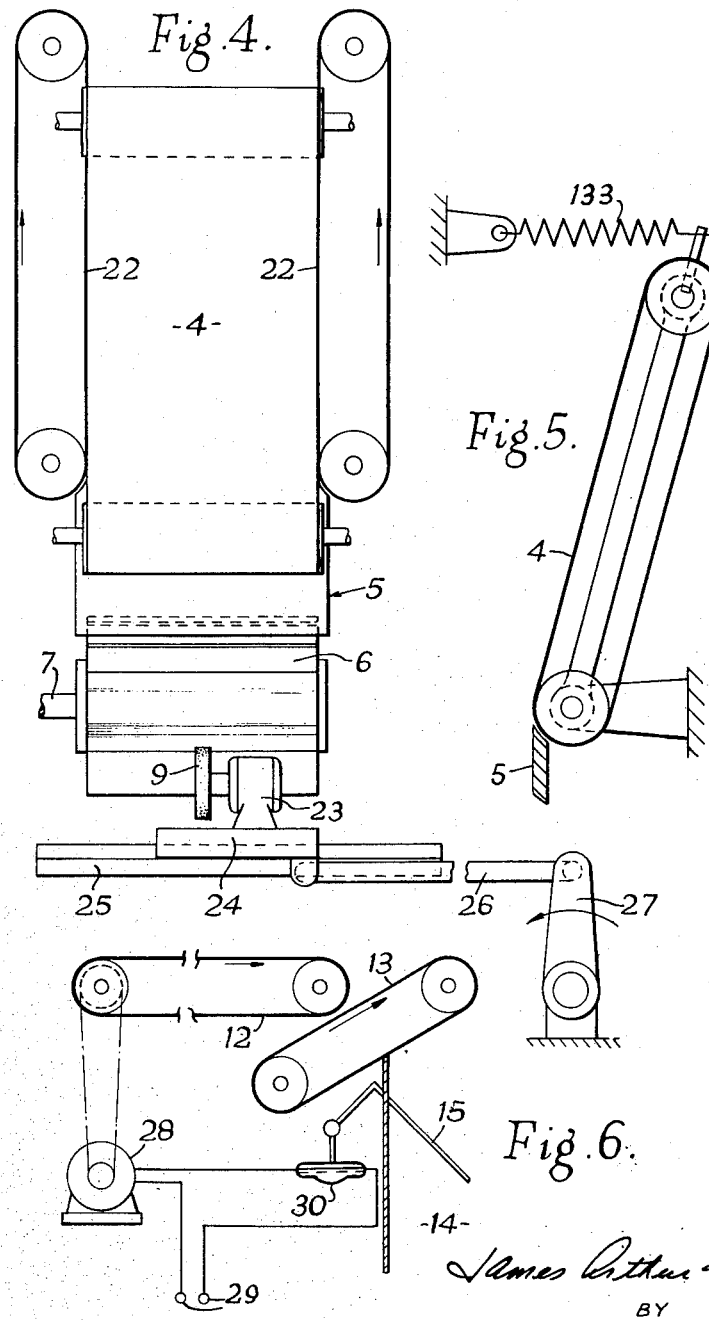

United States Patent Office 2,957,508
Patented Oct. 25, 1960

2,957,508

TOBACCO CUTTING MACHINES

James Arthur Mason, Deptford, London, England, assignor to Molins Machine Company Limited, London, England, a British company Filed May 19, 1959, Ser. No. 814,192

Claims priority, application Great Britain May 27, 1958

1 Claim. (Cl. 146—119)

This invention concerns improvements in rotary tobacco cutting machines, that is, machines in which leaf tobacco is shredded for cigarette making and other purposes.

In most tobacco factories leaf is fed to the cutting machines from the floor above that on which the machines are situated and the present invention provides a machine which obtains full advantage from this fact by a reduction of floor space and improved leaf feeding. However, leaf may be fed to the machine from the floor on which it is situated, as explained later.

According to the invention there is provided a rotary tobacco cutting machine comprising leaf feeding arrangements, the entry to which is at a higher level than the outlet therefrom. Preferably the arrangements are such that leaf tobacco moves down substantially vertically to the cutting position.

The feeding arrangements may comprise a chute whose walls, or some of them, comprise feeder conveyors which urge the leaf downwards and the chute is of diminishing cross-section so that the mass of leaves is compressed to the desired cheese-like consistency.

Beneath the chute there is a mouthpiece through which the cheese passes and across which any suitable cutter-head moves to shear slices from the cheese.

Preferably the cutter head is of the lawn-mower type, that is a number of blades mounted about an axis and sweeping out a cylinder during revolution of the head and the invention further comprises the combination of a substantially vertical feed chute with feeder conveyors and a cutter head of lawn-mower type disposed at the bottom of the chute.

Various constructions according to the invention will now be described with reference to the accompanying drawing, in which:

Figure 4 is a view of Figure 1 looking in the direction of the arrow A and illustrating a modification;

Figure 5 is a diagram, partly in section, of a device for controlling the density of the mass of tobacco destined to form a cheese from which slices are cut in the operation of the machine.

Figure 6 is a diagram, partly in section, of a control device for a feeding conveyor;

Figure 1:
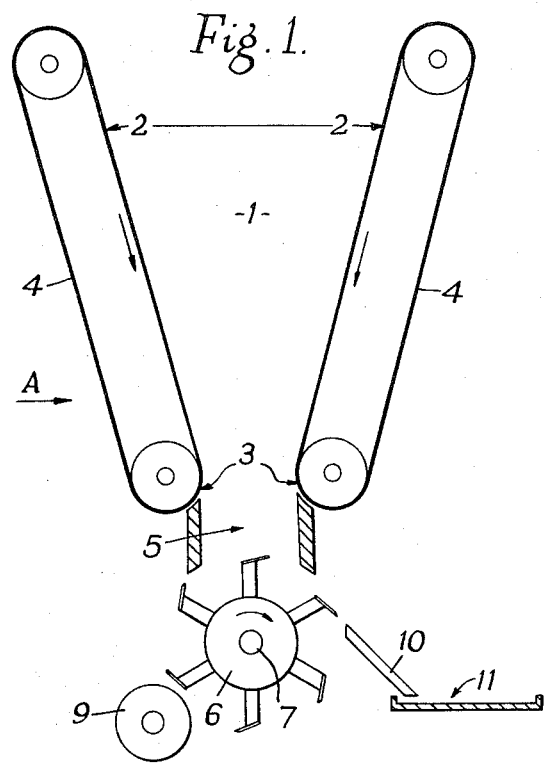
Figure 1 is a diagram, partly in section, of a machine constructed according to the invention.

Referring to Figure 1 of the drawing, 1 is the leaf chute with its entry at 2 and its outlet at 3. Conveyor bands 4 of any suitable construction move as indicated by the arrows and urge the leaf downwards. The front and back walls of the chute may be parallel to one another and they may also comprise feeder conveyors. The work entailed in forming a mass of loose leaves into a cheese is very heavy and as fixed front and back walls would cause considerable friction due to the heavy pressure exerted by the compressing mass, feeder conveyors to such walls are desirable. A suitable arrangement is shown in Figure 4 where the front and back walls comprise feeder conveyors 22.

Figure 3:
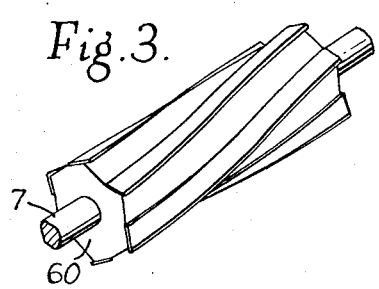
Figure 3 is a perspective view of a cutter head.

The conveyors force the compressed leaves through a mouthpiece 5 and beneath this mouthpiece is a cutter-head 6. This consists of a shaft 7 to which spiders or other suitable knife carriers are fixed and knife blades extend lengthwise of the shaft so that during the revolution the blade edges sweep out a cylindrical surface. Usually the knife edges are helical and the whole head is then very much like the cutting wheel of a lawn mower, as shown at 60 in Figure 3. A grindstone 9 either a long cylinder, or a wheel provided with traversing arrangements rotates in contact with the knife edges, that is the stone is tangential to the said cylindrical surface, and keeps the blades sharp. If a traversing grinding wheel is required the arrangement can be as shown in Figure 4 where the wheel 9 is driven by an electric motor 23 which is fixed to a platform 24 which is reciprocated on a guide 25 by a link 26 reciprocated by an oscillating lever 27. Cut tobacco is discharged down a plate 10, Figure 1, into a box, or on to a conveyor 11, according to factory arrangements.

Figure 2:
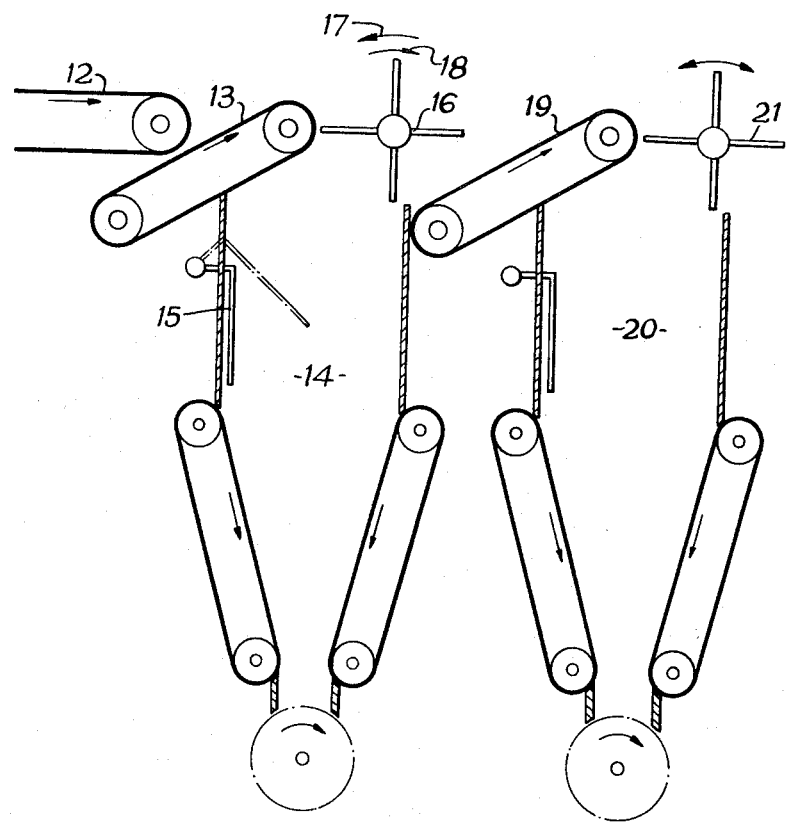
Figure 2 is a diagram, partly in section, of feeding arrangements for several such machines.

Referring now to Figure 2, a conveyor 12 feeds tobacco from a supply, for example, on an upper floor, to a sloping conveyor 13 which carries it upwards so that it may fall down into the chute 14 of the first machine. A detector, shown as a pivoted rod 15, is swung on its pivot as the height of the mass of leaf in the chute alters. If the height becomes too great, the rod movement is sufficient to operate a switch, such as a mercury switch as explained below and the feed of the leaf to the chute is stopped. The rod is shown dotted to represent the position where leaf is still being fed and in full lines when the switch is operated. This detector arrangement is of course applicable to any method of feeding.

Referring now to Figure 6 the conveyor 12 is shown as driven by an electric motor 28 which is fed from terminals 29 through a mercury switch 30 the latter being fixed to the rod 15 for movement therewith. While the rod is in the position shown and for some time after it starts moving towards the left-hand wall of the chute 14 the motor is fed with current and continues to drive the conveyor 12. When the rod 15 reaches the full-line position in Figure 2 the switch is tilted so far that the circuit is broken and the motor and conveyor cease to move.

In Figure 2 of the drawing the feeding of two machines is controlled by the detector rod just described and there is also provided a device known as a doffer. This consists of a paddle wheel 16 which rotates in the direction of arrow 17 to fill the chute 14 until the movement of the detector 15 operates a switch. Then the paddle wheel reverses and rotates in the direction of arrow 18 to feed tobacco on to a sloping conveyor 19 and thus tobacco is discharged into the chute 20 under control of another doffer 21.

Figure 7:
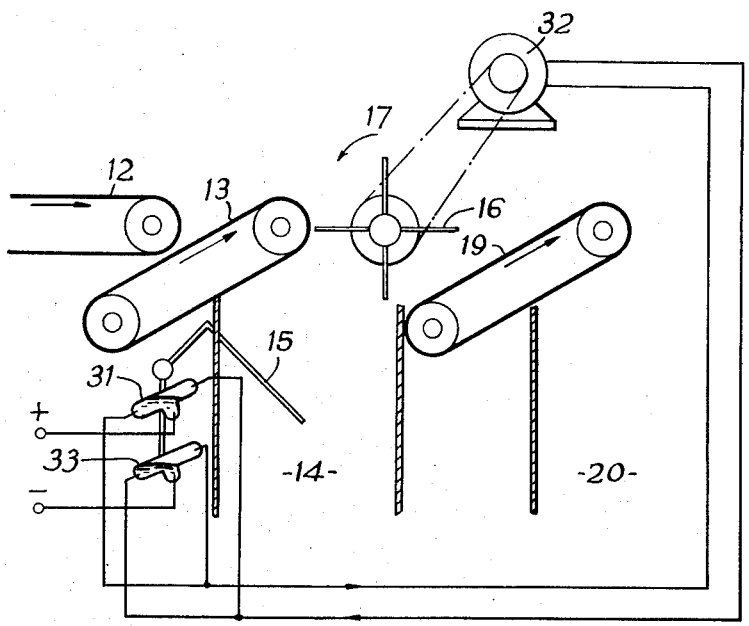
Figure 7 is a diagram, partly in section, of control devices for mechanism shown in Figure 2.

Arrangements for operating in this manner are shown in Figure 7. The rod 15 has two mercury switches 31 and 33 fixed to it and as shown they complete the circuit to a motor 32 and this drives the paddle wheel 16 in the direction of the arrow 17 while the rod 15 is in the position shown. When the rod has been moved near to the left-hand wall of the chute 14 by the incoming tobacco, the switches are so tilted as to reverse to motor connections and the motor reverses and drives the paddle wheel in the opposite direction and delivers leaf to the conveyor 19 which drops it into the chute 20.

It will be understood that any known type of cutter head may be used instead of a lawn-mower type, for example, the head shown in United States patent specification Serial No. 2,535,692.

With a machine constructed as above described there is a considerable saving in floor space and the disposition of the chute means that there is no force acting to make leaves slip and, in fact, feeding is assisted by gravity.

The cutting arrangements are more readily accessible since the bulk of a tobacco-cutting machine consists of the leaf-feeding arrangements and with this construction such parts are off the floor of the factory.

The cheese and the cut product are more easily inspected, at any rate, with a lawn-mower type of cutter, used in conjunction with a vertical tobacco feed substantially above the axis of the cutter.

The density of the cheese may be controlled by pivoting one of the feed conveyors 4 as shown in Figure 5 and a force applied by weights or springs, such as the spring 133, to move the pivoted conveyor to reduce the width of the converging chute.

What I claim as my invention and desire to secure by Letters Patent is:

A rotary tobacco cutting machine of the kind comprising a chute down which tobacco leaves move substantially vertically to a cutting position, the walls of said chute comprising feeder conveyors which urge the leaves downward, said chute being of diminishing cross-section from its top to its bottom whereby the mass of tobacco leaves is compressed to the desired cheeselike consistency, a mouthpiece through which the compressed mass is fed and a rotatable cutter at the mouthpiece outlet whereby slices are cut from the emerging mass and comprising a conveyor system to feed leaves to the top of said chute, a paddle wheel arranged at the top of the chute and positioned to assist in feeding leaves into the chute, a reversible electric motor for driving said paddle wheel and switches for controlling said motor and a detector arranged in the chute, said detector being operatively connected to the said switches and movable in the chute by incoming leaves so that while the chute is only partly filled the paddle wheel rotates in such direction as to feed leaves into the chute but when the chute is filled with leaves the detector is moved to a position where the switches complete a different motor circuit and the direction of rotation of the paddle wheels is reversed.

References Cited in the file of this patent

UNITED STATES PATENTS

| | | |
|---|---|---|
| 2,311,747 | Gooch | Feb. 23, 1943 |
| 2,626,719 | Stock | Jan. 27, 1953 |
| 2,690,777 | Korber et al. | Oct. 5, 1954 |

FOREIGN PATENTS

| | | |
|---|---|---|
| 1,008,635 | Germany | May 16, 1957 |